(12) United States Patent
Poumarede et al.

(10) Patent No.: US 10,294,868 B2
(45) Date of Patent: May 21, 2019

(54) ASSISTANCE DEVICE FOR AN AIRCRAFT TURBINE ENGINE WITH A FREE TURBINE

(71) Applicant: SAFRAN HELICOPTER ENGINES, Bordes (FR)

(72) Inventors: Vincent Poumarede, Tarbes (FR); Jean-Michel Bazet, Gelos (FR); Thomas Klonowski, Sedzere (FR)

(73) Assignee: Safran Helicopter Engines, Bordes (FR)

( * ) Notice: Subject to any disclaimer, the term of this patent is extended or adjusted under 35 U.S.C. 154(b) by 262 days.

(21) Appl. No.: 15/128,845

(22) PCT Filed: Mar. 26, 2015

(86) PCT No.: PCT/FR2015/050766
§ 371 (c)(1),
(2) Date: Sep. 23, 2016

(87) PCT Pub. No.: WO2015/145076
PCT Pub. Date: Oct. 1, 2015

(65) Prior Publication Data
US 2017/0184032 A1 Jun. 29, 2017

(30) Foreign Application Priority Data
Mar. 27, 2014 (FR) ..................... 14 00752

(51) Int. Cl.
*F02C 7/36* (2006.01)
*F02C 7/275* (2006.01)
(Continued)

(52) U.S. Cl.
CPC ............... *F02C 7/275* (2013.01); *F02C 3/10* (2013.01); *F02C 7/36* (2013.01); *F02C 9/42* (2013.01);
(Continued)

(58) Field of Classification Search
CPC .......... F02C 7/268; F02C 7/275; F02C 7/277; F02C 7/32; F02C 7/36; F02C 9/42; F02C 3/10; F05D 2260/85
See application file for complete search history.

(56) References Cited

U.S. PATENT DOCUMENTS 2,938,338 A    5/1960   Creswick et al.
3,237,404 A *   3/1966   Flanigan ................... F02C 7/36
                                                             192/109 F
(Continued)

FOREIGN PATENT DOCUMENTS

EP    2 581 586 A2   4/2013
FR    2 967 133 A1   5/2012
(Continued)

OTHER PUBLICATIONS

International Search Report dated Aug. 12, 2015, in PCT/FR2015/050766 filed Mar. 26, 2015.

*Primary Examiner* — Steven M Sutherland
(74) *Attorney, Agent, or Firm* — Oblon, McClelland, Maier & Neustadt, L.L.P.

(57) ABSTRACT

An assistance device for an aircraft free-turbine turbine engine, the device including first electrical power supply for powering a winding of a starter rotary machine, referred to as a "first" winding, in order to provide first assistance in accelerating the gas generator of the engine. The device further includes a monitor for monitoring the first assistance, and a second power supply for electrically powering a second winding of the rotary machine to provide second assistance in accelerating the gas generator if the monitor observes that the first assistance is insufficient.

17 Claims, 2 Drawing Sheets

Figure 1:
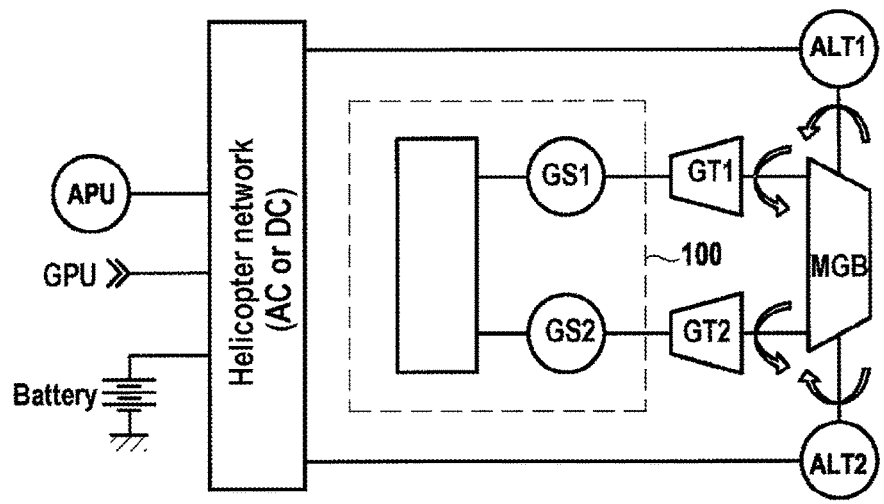

(51) Int. Cl.
*F02C 3/10* (2006.01)
*F02C 9/42* (2006.01)

(52) U.S. Cl.
CPC ....... *F05D 2220/329* (2013.01); *Y02T 50/671* (2013.01)

(56) References Cited

U.S. PATENT DOCUMENTS

| | | | | |
|---|---|---|---|---|
| 3,368,347 | A | * | 2/1968 | Wickman ................ F02C 3/113 477/30 |
| 2010/0058731 | A1 | * | 3/2010 | Haehner ................. F01D 15/08 60/39.15 |
| 2010/0083632 | A1 | * | 4/2010 | Foster .................... B64D 27/16 60/39.181 |
| 2012/0211981 | A1 | * | 8/2012 | De Wergifosse ....... F02C 7/275 290/31 |
| 2012/0275068 | A1 | | 11/2012 | Cullen et al. |
| 2013/0086919 | A1 | | 4/2013 | Dooley et al. |
| 2013/0219905 | A1 | | 8/2013 | Marconi et al. |

FOREIGN PATENT DOCUMENTS

| | | |
|---|---|---|
| RU | 2 050 455 C1 | 12/1995 |
| RU | 2 467 192 C1 | 11/2012 |
| WO | WO 2011/086019 A2 | 7/2011 |

\* cited by examiner

ASSISTANCE DEVICE FOR AN AIRCRAFT TURBINE ENGINE WITH A FREE TURBINE

TECHNICAL CONTEXT

The invention lies in the field of free-turbine turbine engines for an aircraft having a plurality of turbine engines. The aircraft may in particular be a helicopter. It should be recalled that a turbine engine with a free turbine includes a power turbine or "free" turbine that, in a helicopter, drives the rotors of the helicopter via an overrunning clutch (freewheel) and a main gearbox (MGB).

The engine also has a gas generator comprising in particular a compressor, a combustion chamber, and a high pressure (HP) turbine.

A speed-reducing accessory gearbox serves to connect the shaft of the gas generator to an electrical machine constituted by a stator and a rotor that is capable of operating equally well as a motor (starter) or as a generator.

In motor mode, the electrical machine is powered by a source of electricity and it develops driving torque so as to drive rotation of the gas generator of the engine, in particular for the purpose of starting it, thus providing assistance on starting.

In generator mode, the electrical machine is driven in rotation by the gas generator so as to take mechanical power from the gas generator, which power is then converted into electrical power.

For an aircraft having two turbine engines in a cruising flight situation, proposals are made in Document US 2013/219905 to put one of the two engines into a standby mode. Because of the freewheel, the free turbine and the main gearbox are desynchronized. In parallel, the other engine (or the other engines) is/are operated at a power rating that is increased, thereby making it possible to maintain normal flight conditions. The overall fuel consumption of the system is decreased, since the specific consumption of the turbine engine maintained in operation is then smaller.

Several variants of such a standby mode have been proposed.

In a first variant, the gas generator of the desynchronized gas turbine may be regulated on a slow idle power rating by continuing to deliver fuel thereto. That can be done with or without additionally using the electrical machine and the accessory gearbox to supply the gas generator with prolonged assistance driving torque (assistance for rotation at constant speed).

In a second variant, it is proposed, in contrast, to extinguish the combustion chamber of the turbine engine completely, while using the rotary machine to maintain the gas generator in rotation at a speed suitable for facilitating re-ignition at the end of the stage of cruising flight. That likewise constitutes prolonged assistance (assistance for rotation at constant speed).

Those modes of operation are potentially maintained throughout the duration of cruising flight.

In terms of the performance required of the rotary machine driving the gas generator, normal restarting of the desynchronized engine is then analogous to the usual function of starting on the ground. Such normal restarting generally lasts for a few tens of seconds between beginning starting and the moment at which the engine has reached a speed that is sufficient to generate useful power on the free turbine. By way of example, such starting is undertaken in order to proceed with a maneuver, such as landing, that is anticipated with a certain amount of time in advance and that, for its execution, requires both engines to be operating simultaneously.

Such restarting requires the rotation of the gas generator of the engine to be accelerated. Such acceleration is obtained by increasing the fuel flow rate.

Nevertheless, it is sometimes necessary to be in a position to reactivate the desynchronized engine rapidly, in particular in an emergency situation, e.g. in the event of a failure of another engine, if the total number of engines is three or more, or of the other engine if there are only two engines. In order to satisfy safety requirements, the maximum time authorized between the request for emergency starting and the moment at which the engine as restarted in this way is capable of delivering useful power is typically less than 10 seconds.

In particular, this need for it to be possible for the engine that has been shut down to be restarted quickly is the reason why the gas generator is maintained rotating at a speed that facilitates re-ignition in the modes of operation in which the combustion chamber is extinguished.

Regardless of whether the gas generator is in an idling situation or has its combustion chamber extinguished, it is preferable, in particular for emergency restarting, to apply nigh power to the gas generator shaft because of the large amount of inertia of the rotating assemblies and because of the opposing torque from the compressor of the engine. This power needs to be delivered over a duration that is short, of the order of a few seconds. It is estimated that, during this short lapse of time, the power developed by the emergency starting system needs to be approximately five to ten times greater than the power needed for normal starting.

Among other solutions, US 2013/219905 suggests using electrical energy, in particular from a supercapacitor, to supply a burst of assistance for accelerating the rotation of the gas generator. In general manner, since a large amount of power is needed, it is advantageous to have an electrical energy storage member that is capable of delivering a large amount of power during a short lapse of time. The electrical power may be applied via a starter rotary machine.

Proposals are also made in Document US 2013/086919 to make use of two supercapacitors, each charged by a respective electricity generator driven by the gas generator of a respective one of the engines, and each serving to provide a burst of power for starting another engine that is in a shutdown state.

In Document US 2010/058731, a burst of acceleration assistance is delivered to the gas generator of a turboshaft engine, in particular by delivering mechanical power to the as generator via an electrical machine that is driven in rotation by the free turbine.

Document US 2013/219905 also describes a turbine engine assistance device.

Thus, solutions have been proposed to supply the high power needed for emergency restarting of a turbine engine.

However, in this context, given the stakes in terms of safety, it can be understood that emergency starting systems must be capable of guaranteeing a high level of availability. Specifically, in the event of power being lost from the turbine engine that is the only engine providing the helicopter with propulsion, any inability in an emergency to restart the turbine engine that was initially in standby mode can lead to a total loss of driving power.

Such a requirement for a high level of availability can also apply to the function of normal restarting of an engine on standby.

Specifically, when the second engine is operating in nominal manner, inability to restart the turbine engine that was initially in standby mode normally on returning to a twin-engined flight condition, in particular when preparing to land, can make it necessary to make use of one engine inoperative (OEI) contingency power ratings on the engine that is in operation.

This situation should be avoided since it increases the workload on the crew and since the use of OEI contingency ratings is very damaging for an engine.

Definition of the Invention and Associated Advantages

To solve these problems, there is proposed an assistance device for an aircraft free-turbine turbine engine, the device comprising first power supply means for electrically powering a first winding of a starter rotary machine in order to drive the gas generator of the engine, the device being characterized in that it further comprises monitor means for monitoring the first power supply means and the first winding, and second power supply means, said monitor means causing the second power supply means to supply electrical power to a second winding of the rotary machine in order to drive said gas generator in the event of the monitor means observing insufficient power in the first power supply means or in the first winding.

As mentioned above, it is specified that the first assistance is assistance to rotary motion by mechanically driving the gas generator by means of the rotor of the starter rotary machine, and the second assistance is also rotary motion assistance by mechanically driving the gas generator by the rotor of a starter rotary machine, which may be the previously-mentioned starter rotary machine or another starter rotary machine.

By means of these characteristics, if the circuit having the first winding and its power supply suffers a failure (or more generally provides insufficient power), thereby losing all or part of the ability of the first winding to assist the gas generator, it is then possible to mitigate the difficulty by using the second winding and its power supply circuit.

The starter rotary machine(s) may be an alternating current (AC) machine or a direct current (DC) machine. The windings may be rotor windings or stator windings, depending on the structure of the rotary machine used.

The second winding may be powered using elements that are also used for powering the first winding, but the power supply circuit could alternatively be entirely distinct and segregated, which is advantageous. This point is developed below.

In order to detect that the first assistance is not sufficient, monitor means are used that monitor one or more elements of the power train electrically powering the starter rotary machine, the supervisor system of the turbine engine, and/or the engine itself.

In an advantageous embodiment, the assistance device comprises the starter rotary machine and also another starter rotary machine for providing assistance in accelerating the gas generator of a second turbine engine of the aircraft, the second winding being electrically connected in parallel with said other rotary machine to a common electrical power supply path.

This makes it possible to share the energy sources and the power supply means and thus to reduce the weight of the elements needed. In particular, the energy source in question may be the source for priority use when restarting the second engine, and which is thus used in an emergency for restarting the first engine, should its starter circuit using the first winding fail. The source may be an energy storage element, suitable for use in particular for emergency restarting.

The assistance device may include a power converter and is preferably configured so that a power converter transmits electrical energy to the second winding of the starter rotary machine, or exclusively to the other starter rotary machine. This configuration may be implemented using a pair of contactors included in the assistance device and not capable of both being in the closed position simultaneously, so as to ensure electrical energy is transmitted exclusively to the second winding or to the other starter rotary machine.

In an embodiment, said starter rotary machine included in the assistance device is a fault-tolerant AC rotary machine being a double winding or double star machine, the second winding being its second winding.

In known manner, such AC rotary machines of synchronous or asynchronous type are characterized by two independent sets of three-phase windings on the stator that are wound on a common magnetic circuit, each winding being powered by its own DC/AC power converter. Although covering numerous architecture variants, the design of such machines relies on the general principle that consists in guaranteeing a high level of electrical isolation and physical, thermal, and magnetic segregation between each of the two windings. This separation makes it possible to ensure that an electrical failure, such as for example a short circuit or an open circuit, occurring in the first winding or its DC/AC power supply converter, has no functional impact on the second winding and thus on the ability of the starter to deliver assistance torque to the gas generator. By sharing the stator magnetic circuit and the mechanical elements such as the rotor, the bearings, and the structure (casing), a rotary machine of this type is substantially more compact and lighter in weight than a set of two completely independent machines giving equivalent overall performance, while also providing a high level of tolerance to internal electrical faults or to faults in the power supply converter.

The use of a double winding machine also makes it possible to install only one rotary machine, thereby simplifying assembly on the accessory gearbox of the turbine engine.

In an embodiment, the first winding is of dimensions enabling it to provide acceleration assistance with performance that is better than the performance provided by the second winding.

Thus, the starter rotary machine may be of dimensions enabling emergency starting (rapid starting) of the turbine engine with electrical power being supplied to said first winding only, while still retaining reasonable dimensions overall, and still providing redundancy in the ability to start in a non-urgent situation (normal starting).

In an embodiment, the second winding is of dimensions enabling acceleration assistance to be provided with performance similar to that provided by the first winding.

This provides complete redundancy in ability to restart, and providing the windings and the magnetic circuit are of appropriate dimensions, this includes the ability to perform an emergency restart.

In an embodiment, the assistance device has two power converters, each serving to transmit electrical power in controlled manner to said first and second windings respectively.

This makes it possible to obtain a fine transition between two assistances in the event of detecting a failure in the first circuit. This also enables acceleration assistance to be controlled while using two windings, which is useful in particular in an emergency situation since it is then possible to benefit for this acceleration simultaneously from the power developed by each of the windings.

In an embodiment, the assistance device has a first electrical energy source for powering one of the first winding and the second winding, and the assistance device also is configured so that the other one of the second winding and the first winding can be powered by a second energy source that is distinct from the first energy source, thereby providing greater safety in the event of a failure of one of the energy sources or of its electrical connections.

In an embodiment, the device further comprises another starter rotary machine for delivering acceleration assistance to the gas generator of a second turbine engine of the aircraft, said other rotary machine having a winding referred to as a "third" winding, the assistance device further including an electrical energy source configured as a function of need to power the first or the other winding.

Thus, on a twin-engined aircraft, acceleration assistance is obtained for each of the engines, while not increasing the sources of energy since the energy source for the first engine is also used for the second engine.

In an embodiment, the starter rotary machine included in the assistance device is also a generator actuated by the engine when it is active, the second winding being the winding of a second rotary machine included in the assistance device, which second machine is a starter only.

The generator may be used to recharge an energy storage element included in the assistance device or external thereto.

The energy storage element may be usable to supply the electrical power for assisting acceleration of the gas generator. As mentioned in the introduction, this is useful, in particular during a stage of flight of the aircraft in which a second engine delivers power to the rotary wing of the aircraft in order to enable it to fly, and in an emergency whenever it is appropriate to restart (reactivate) the first engine.

By having two distinct rotary machines, with only one serving to generate electricity, it is possible to dimension the two windings and the yokes of the rotary machines better, while installing energy storage for emergency restarting of an engine in flight and while ensuring physical and functional segregation, which enhances the availability of the normal or emergency engine starting function, between the two rotary machines and their power supply converters, in embodiments in which they are connected to such converters.

In an embodiment, the second winding is the winding of a second rotary machine included in the assistance device, the second rotary machine being a DC machine, and the first rotary machine also included in the assistance device, being an AC machine.

This makes it possible to provide torque/speed control for the first rotary machine operating with AC that is used on a priority basis and to have an emergency rotary machine that is powered directly from the on-board DC network of the aircraft, which machine is presently the starter device in the majority of helicopters of small or medium power that are provided with turbine engines and with an electrical starter.

In an embodiment, the first winding is powered by an electricity storage member and the second winding is powered by the on-board network of the aircraft. An aircraft is thus provided, e.g. a twin-engined helicopter, having an assistance device of the invention, the second winding being powered by the on-board network of the aircraft.

This makes it possible to have stored power for emergency restarting or starting while still being capable of mitigating a failure of the electrical storage member but without duplicating it, which can be considered as penalizing in terms of size and weight.

In an embodiment, the means for powering the second winding include a contactor that is closed if the monitor means observe a difficulty or inability in acceleration of said gas generator, e.g. for starting said engine using the first winding.

A contactor is an electromechanical device that is simple and presents a low risk of failure.

There is also provided a method of assisting an aircraft free-turbine turbine engine, the method comprising a step of electrically powering a first winding of a starter rotary machine by first electrical power supply means in order to drive the gas generator of the engine, the method being characterized in that it further comprises a step of monitoring the first power supply means and the first winding and a step of electrically powering a second winding of the rotary machine by second electrical power supply means in order to drive said gas generator if it is observed during the monitoring step that there is insufficient power in the first power supply means or in the first winding.

LIST OF FIGURES

Figure 2:
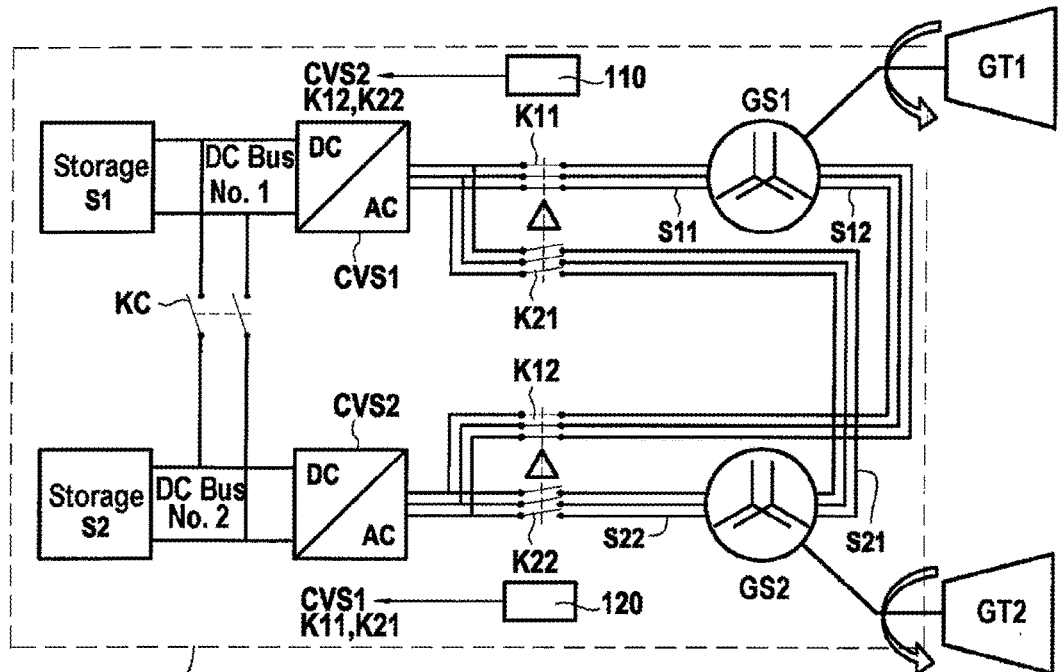
Figure 3:
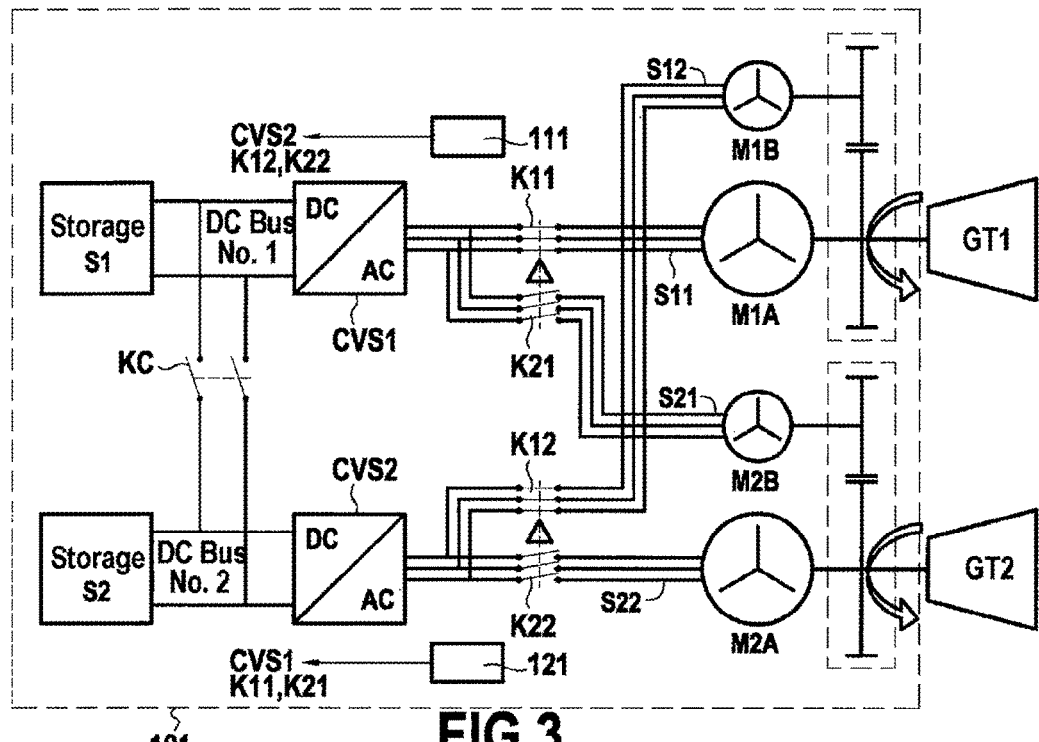
Figure 4:
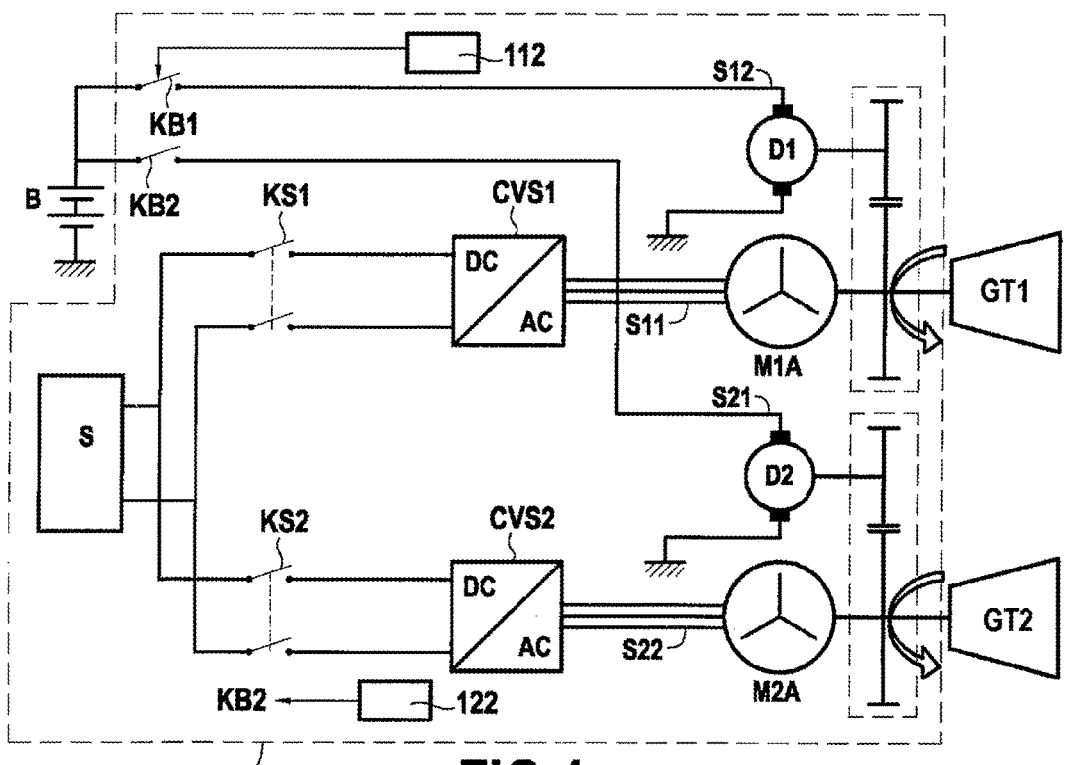

FIG. 1 shows the context of embodiments of the invention.
FIG. 2 shows a first embodiment of the invention.
FIG. 3 shows a second embodiment of the invention.
FIG. 4 shows another embodiment of the invention.

DETAILED DESCRIPTION OF EMBODIMENTS

With reference to FIG. 1, the general electrical architecture of an embodiment of the proposed system is as follows. It is given in the context of a helicopter having two turbine engines.

The main gearbox MGB is driven by the turbine engines GT1 and GT2. In this example they are free turbine turboshaft engines. Each has a gas generator and a power turbine (free turbine) driving the main gearbox (MGB) via a freewheel.

Electricity is generated on board the aircraft by at least two alternators ALT1 and ALT2 driven by the MGB. Although this architecture, which is usually reserved for heavy helicopters, is not crucial for using the present invention, and does not constitute an essential characteristic, it is technically preferable to the conventional solution on heavy aircraft that consists in driving the electricity generators from the gas generators of the turboshaft engines. Specifically, since a fuel saving in cruising flight is obtained by putting one of the engines on standby, as mentioned in the introduction, where standby is a mode of operation that is incompatible with taking any power from the gas generator, it appears pertinent, in particular in terms of safety, to decouple functionally the generation of electricity on board the aircraft from the mode of operation of its engines.

ALT1 and ALT2 power the electricity network of the aircraft, with it being possible for other energy sources available for powering this network to be constituted by an on-board auxiliary power unit (APU), one or more storage batteries, or indeed a ground power unit (when on the ground).

Each engine GT1 and GT2 has a respective rotary machine GS1 and GS2 suitable for operating as a starter and as a generator and mechanically connected to the gas generator of the corresponding engine via an accessory gearbox.

In order to optimize the compactness and the weight of the device, it is preferable for GS1 and GS2 to present a machine architecture that is compatible with being driven at high speed by the gas generator, and thus without a rotor winding, such as by way of example and in non-exhaustive manner: a brushless synchronous machine with permanent magnets; a variable reluctance machine; or a brushless squirrel-cage asynchronous machine.

The two machines GS1 and GS2 are included in an assistance device 100 operating independently of the electricity network of the aircraft.

With reference to FIG. 2, there is shown a first embodiment of the assistance device 100. The electrical machines GS1 and GS2 are double-winding electrical machines, or AC rotary machines that are fault-tolerant.

These machines are constituted by a single magnetic circuit or yoke and two distinct multiphase stator windings or coils, referenced S11 and S12 for GS1 and S21 and S22 for GS2.

By way of example, GS1 and GS2 are machines of synchronous or of asynchronous type.

The windings S11 and S12 are connected respectively to reversible DC/AC power converters CVS1 and CVS2. Each of them constitutes an interface between the multiphase AC circuit of the winding and a DC circuit constituted by a DC bus connecting the converter to an electricity storage member. The electricity storage members are referenced respectively S1 and S2, and the DC buses connecting them are referenced bus No. 1 and bus No. 2.

In this example the electricity storage members are DC members, e.g. being supercapacitors, hybrid capacitors, storage batteries, or flywheels incorporating respective DC/AC converters.

The windings S12 and S21 are connected to the opposite power converters, i.e. respectively to CVS2 and CVS1. The windings S12 and S22 are thus in branch or parallel connections relative to each other at the outlet from the converter CVS2, while the windings S11 and S21 are in branch connections relative to each other at the outlet from the converter CVS1.

Contactors K11, K21, K12, and K22 are present for electrically isolating or connecting the respective windings S11, S21, S12, and S22, and they operate or are actuated in coordinated manner so that the converters CVS1 and CVS2 can each be used for controlling at most a single rotary machine at any given instant. Thus, closing the contactor K11 or K21 causes the contactor K21 or K11 to be opened, and closing the contactor K12 or K22 causes the contactor K22 or K12 to be opened.

Given that in any event it is only necessary to start a single engine at a time, this set of contactors and the associated control logic advantageously enables the power converters to be shared between the two rotary machines, thereby reducing the number of machines needed from four to two, while conserving the level of redundancy that is required to ensure that the normal and emergency starting functions are available, thereby securing a distinct improvement in terms of weight and size.

A contactor KC serves to connect together the two DC buses No. 1 and No. 2 electrically, or on the contrary to isolate them from each other.

In this example, the rotary machines GS1 and GS2 are both generators and starters. When operating as generators, they are driven in rotation by the gas generator of the corresponding engine, and they are capable via one or the other of their stator windings of transferring electrical energy to the storage elements S1 and/or S2, or to the sole storage element if only one storage element is provided.

Once the electrical energy storage elements have been charged, it is possible to undertake a stage of single-engined flight. In the presently-described scenario, the engine GT1 delivers driving power while the engine GT2 is maintained in one of the standby modes described in the introduction. In order to restart the engine GT2, e.g. prior to landing, or in the event of losing power from the engine GT1, it is proposed to begin by electrically isolating the buses No. 1 and No. 2 from each other using the contactor KC so as to ensure that a failure does not propagate from one portion of the system to another. Thereafter the contactor K21 is closed with the contactor K11 being open, and the converter CVS1 is inhibited, ready to operate but not actually powering the winding S21.

Simultaneously, the contactor K22 is closed, K12 being open, and the converter CVS2 is operated as an inverter to control the rotary machine GS2 operating in motor mode and to regulate the torque it delivers in application of a relationship optimized for normal or emergency starting of the engine as a function of circumstances. The gas generator of the engine GT2 is thus actuated so as to enable the engine to be started.

If a failure or insufficient power occurs on the power train S2-CVS2-K22-S22 and threatens the ability to accelerate the gas generator of the engine GT2 sufficiently, this is identified by monitor means 120. The monitor means 120 then cause the converter CVS1 to be put into action.

In a first variant, the converter CVS2 is disconnected from the winding S22 by using the contactor K22, or is put on standby, and the power converter CVS1 acts alone to power the winding S21 in application of a torque control relationship identical to that being implemented by the converter CVS1. Thus, the starting sequence is continued. Although energy was initially taken from the storage member S2, it is subsequently taken from the storage member S1.

In a second variant, and in the event of a partial or progressive failure of the power train S2-CVS2-K22-S22, a strategy of controlling the converters sequentially is implemented, with torque being transferred from one branch to the other in full or in part, and in continuous manner.

It is thus possible for assistance by means of the two windings to be mutually exclusive, or on the contrary to be simultaneous.

It is specified that a failure or insufficient power in the power train S2-CVS2-K22-S22 may be detected by the monitor means 120 at each of the elements in the power train S2-CVS2-K22-S22 (including on the DC bus), or at the system for supervising the engine GT1, e.g. by comparing the acceleration of the gas generator with a predetermined chart.

The power train S1-CVS1-K11-S11 and the assistance in accelerating the gas generator of the engine GT1 are monitored in the same manner by monitor means 110 that perform a role symmetrical to the monitor means 120.

In a variant, each of the windings S11, S12, S21, and S22 is of dimensions that are sufficient, in motor operation, to enable it on its own to supply the performance necessary for emergency starting of the corresponding engine, and a fortiori for normal starting. Thus, in the event of a failure or insufficient power in one of the power trains, normal starting and emergency starting can be carried out in full with the replacement power train.

In another variant, only the windings S11 and S21 are of dimensions enabling them individually to supply the performance needed for an emergency start. Nevertheless, all four windings S11, S21, S12, and S22 are of dimensions suitable for enabling them to supply the performance necessary for normal starting. Thus, in the event of a failure or insufficient power on one of the power trains involving S11 or S21, normal starting can be carried out in full with a replacement power train, while emergency starting is performed using performance similar to that required for normal starting, using one of the windings S12 or S22.

Finally, in another variant, the windings S11 and S12 (respectively S22 and S21) are of dimensions enabling them together, when powered simultaneously, to deliver the torque and power performance required for emergency starting the engine GT1 (or respectively GT2). For such emergency starting, both converters CVS1 and CVS2 are activated simultaneously, one as a master and the other as a slave, so as to power both windings in coordinated manner. It is also proposed in this variant that the windings S11 and S12 (respectively S22 and S21) should be of dimensions suitable for enabling normal starting using only one winding, thus making it possible in the event of a failure or insufficient power in one of the power trains involved to ensure that normal starting of the engine can be carried out in full in any event.

With reference to FIG. 3, there is described another embodiment of an assistance device, given reference 101. The double-winding machines are replaced by sets of two single-winding rotary machines.

Thus, replacing GS1, there is an AC rotary machine M1A having a single stator winding together with, on another outlet of the assistance gearbox of the engine GT1, another AC rotary machine M1B likewise having a single stator winding. In this embodiment, the winding S11 is the winding of the machine M1A and the winding S12 is the winding of the machine M1B. The windings are multiphase windings.

The machine M1A is both a generator and a starter, while the machine M1B is a starter only. M1B may possibly be mechanically connected to the gas generator of the engine via a freewheel, thus making it possible to design the starter only for the maximum drive speed in starter mode, i.e. in the range 50% to 60% of NG, instead of for the maximum speed of the gas generator, i.e. 100% of NG. Thus, during stages of flight during which the engine is in operation, the electrical energy storage element S1 is recharged via the machine M1A and the converter CVS1, with the rotary machine M1B being left at rest.

It is also specified that one of the two machines M1A or M1B is of dimensions enabling it to supply the required performance in the event of emergency starting, while the other machine need only be of dimensions enabling it to supply the performance required for normal starting.

Similar elements are installed on the assistance gearbox of the engine GT2, with the electrical machines being referenced M2A and M2B.

Monitor means 111 and 121 monitor the acceleration assistance of the gas generators of the engines, as in FIG. 2, so as to cause the power converters CVS1 and CVS2 to be put into operation.

With reference to FIG. 4, there is presented another embodiment of an assistance device, given reference 102. The machines M1B and M2B are replaced by DC machines with brushes and commutators, and given references D1 and D2. Their respective rotor windings S12 and S21 are connected to the on-board DC network of the helicopter, which is a network operating at 28 volts DC (VDC) comprising in particular at least one storage battery B. Contactors KB1 and KB2 (generally not coordinated with each other) serve to isolate these machines from the on-board network, or on the contrary to connect them thereto.

A single electrical energy storage member S may also serve in the variant shown to replace the storage members S1 and S2 in the above-described embodiment. Contactors KS1 and KS2 enable this member S to be connected either to the converter CVS1 or to the converter CVS2. It is nevertheless possible to use two storage members as shown in FIGS. 2 and 3.

Monitor means 112 and 122 monitor the acceleration assistance of the gas generators of the engines, as in FIGS. 2 and 3, this time for the purpose of causing the switches KB1 and KB2 to switch over.

In the event of a failure or insufficient power preventing starting of an engine, e.g. the engine GT1, by using the corresponding AC rotary machine, i.e. the machine M1A for the engine GT1, the contactor KB1 is closed and the DC motor D1 takes over, making it possible to perform normal starting of the engine GT1, even though the assistance torque is no longer specifically controlled.

The DC machines D1 and D2 may be generators as well as being starters. If they are not generators, they may be connected to the accessory gearbox of the corresponding engine via respective freewheels.

The invention is not limited to the embodiments described, but extends to any variant within the ambit of the scope of the claims.

The invention claimed is:

1. An assistance device for a turbine engine of an aircraft, the turbine engine including a free-turbine, the assistance device comprising:
   a first starter rotary machine having a first winding; and
   a first power supply assembly which electrically powers the first winding to drive a gas generator of the turbine engine, the first power supply assembly including a first DC/AC power converter and a first contactor;
   a second winding distinct from the first winding, said first starter rotary machine being a double-winding rotary machine, or being with a second rotary machine, said first starter rotary machine and the second rotary machine each being a single-winding rotary machine;
   a monitor which monitors the first power supply assembly and the first winding; and
   a second power supply assembly which electrically powers the second winding in order to drive the gas generator of the turbine engine, the second power supply assembly including a power supply and a second contactor,
   wherein the monitor is configured to identify insufficient power in the first power supply assembly or in the first winding and to cause the second winding to be electrically powered by the second power supply assembly when such insufficient power is identified.

2. The assistance device according to claim 1, further comprising a second starter rotary machine for providing assistance in accelerating the gas generator of a second turbine engine of the aircraft, the second winding being electrically connected in parallel with said second starter rotary machine to a common electrical power supply path.

3. The assistance device according to claim 2, further comprising a second DC/AC power converter which transmits electrical energy to the second winding of the first starter rotary machine, or exclusively to the second starter rotary machine.

4. The assistance device according to claim 3, further comprising a third contactor connecting the second DC/AC power converter to a first winding of the second starter rotary machine, wherein the second contactor and the third contactor cannot both be in a closed position simultaneously, so as to ensure electrical energy is transmitted exclusively to the second winding of the first starter rotary machine or to the second starter rotary machine.

5. The assistance device according to claim 1, wherein the monitor monitors one or more elements which electrically power the first starter rotary machine.

6. The assistance device according to claim 1, wherein the monitor monitors a supervisor system of the turbine engine.

7. The assistance device according to claim 1, wherein said first starter rotary machine is a fault-tolerant AC rotary machine being a double winding or double star machine, the second winding being a second winding of the first starter rotary machine.

8. The assistance device according to claim 7, wherein the second winding is of dimensions enabling acceleration assistance to be provided with performance similar to that provided by the first winding.

9. The assistance device according to claim 7, wherein the second winding is of dimensions enabling acceleration assistance to be provided with performance greater than that provided by the first winding.

10. The assistance device according to claim 1, further comprising a second DC/AC power converter, the first and second DC/AC power converters serving to transmit electrical power in controlled manner to said first and second windings, respectively.

11. The assistance device according to claim 1, further comprising a first electrical energy source that powers the first winding, and is distinct from the power supply of the second power supply assembly.

12. The assistance device according to claim 1, further comprising a second starter rotary machine for delivering acceleration assistance to the gas generator of a second turbine engine of the aircraft, said second starter rotary machine having a first winding; and an electrical energy source which powers the first winding of the first starter rotary machine or the first winding of the second starter rotary machine.

13. The assistance device according to claim 1, wherein the first starter rotary machine is included in the assistance device and is also a generator configured to be actuated by the turbine engine, the second winding being the winding of the second rotary machine included in the assistance device and constituting a starter only.

14. The assistance device according to claim 1, wherein the second winding is the winding of the second rotary machine included in the assistance device, the second rotary machine being a DC machine, and the first starter rotary machine, included in the assistance device, being an AC machine.

15. The assistance device according to claim 1, wherein the second contactor closes when it is not possible to accelerate said gas generator using the first winding.

16. An assistance device for a turbine engine of an aircraft, the turbine engine including a free-turbine, the assistance device comprising:
a first starter rotary machine having a first winding; and
a first power supply assembly which electrically powers the first winding to drive a gas generator of the turbine engine, the first power supply assembly including a first DC/AC power converter and a first contactor;
a second winding distinct from the first winding, said first starter rotary machine being a double-winding rotary machine, or being with a second rotary machine, said first starter rotary machine and the second rotary machine each being a single-winding rotary machine;
a monitor which monitors the first power supply assembly and the first winding; and
a second power supply assembly which electrically powers the second winding in order to drive the gas generator of the turbine engine, the second power supply assembly including a power supply and a second contactor,
wherein said monitor is configured to identify insufficient power in the first power supply assembly or in the first winding and to cause the second winding to be electrically powered by the second power supply assembly when such insufficient power is identified, and the first winding is powered by an electricity storage member and the second winding is powered by an on-board network of the aircraft.

17. A method of assisting a turbine engine of an aircraft, the turbine engine including a free turbine, the method comprising:
electrically powering a first winding of a first starter rotary machine by a first electrical power supply assembly in order to drive a gas generator of the turbine engine, the first electrical power supply assembly including a first DC/AC power converter and a first contactor;
monitoring the first electrical power supply assembly and the first winding; and
electrically powering a second winding by a second electrical power supply assembly in order to drive said gas generator when, during the monitoring, there is insufficient power in the first electrical power supply assembly or in the first winding, the second electrical power supply assembly including a power supply and a second contactor, the second winding being distinct from the first winding, said first starter rotary machine being a double-winding rotary machine, or being with a second rotary machine, said first starter rotary machine and the second rotary machine each being a single-winding rotary machine.

* * * * *